Figures 1, 2:
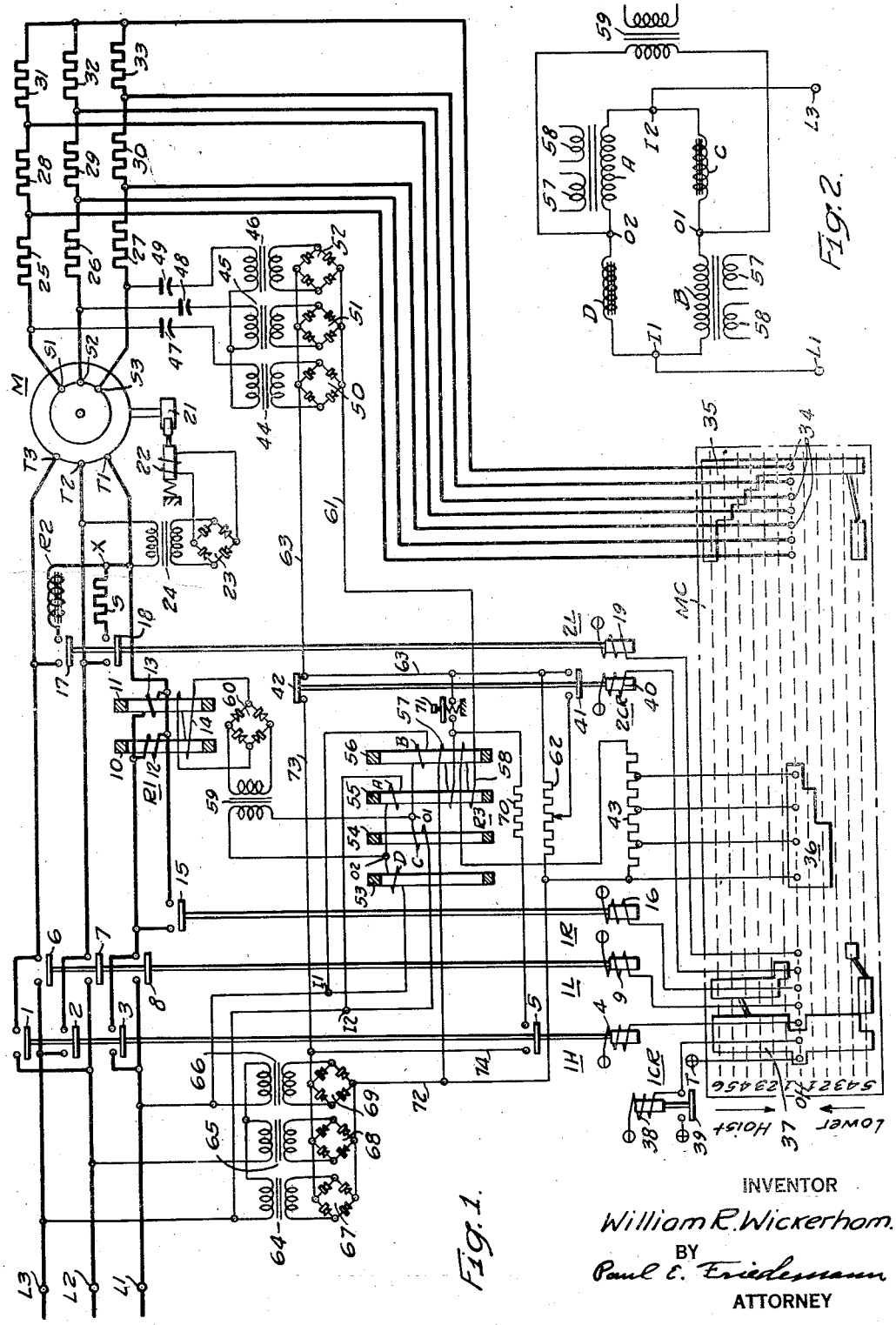

Oct. 1, 1946.    W. R. WICKERHAM    2,408,461
CONTROL SYSTEM
Filed Jan. 1, 1945    2 Sheets—Sheet 1

INVENTOR
William R. Wickerham.
BY
Paul E. Friedemann
ATTORNEY

Patented Oct. 1, 1946

2,408,461

UNITED STATES PATENT OFFICE 2,408,461

CONTROL SYSTEM

William R. Wickerham, Swissvale, Pa., assignor to Westinghouse Electric Corporation, East Pittsburgh, Pa., a corporation of Pennsylvania Application January 1, 1945, Serial No. 570,945

13 Claims. (Cl. 172—274)

My invention relates to motor control systems which permit applying a multi-phase voltage of controlled unbalance to the primary terminals of an alternating-current motor in order to thereby control the speed torque characteristic of the motor.

It is among the broader objects of my invention to devise a control system of the just-mentioned type in such a manner that the motor operates under balanced or relatively little unbalanced voltage at high speeds in order to then develop multi-phase torque, but operates under a high degree of voltage unbalance at lower speeds in order to approach single-phase or zero torque near zero speed, or to develop counter torque especially under overhauling load conditions. More in general, it is an object of the invention to permit operating an alternating-current motor at subsynchronous speeds under stable operating conditions.

I have shown in my copending applications Serial Nos. 513,351, 513,352, 524,387, and 525,629 that a performance of the above-mentioned character can be obtained by providing the primary energizing circuit of the motor with voltage balance control means and causing them to vary the balance condition of the voltage imposed on the motor terminals in accordance with the motor speed so as to increase the unbalance at decreasing motor speed. One way of securing such a response to speed, according to these copending applications, is to equip the motor with a pilot generator whose output voltage, being a measure of the motor speed, is used for controlling the adjustment of the unbalance control means. Another way, also disclosed in the copending applications, is to control the voltage unbalancing means in the primary motor circuit by means of a voltage derived from the secondary motor circuit.

The use of a speed measuring pilot generator affords accurate and well defined results but requires the addition of a rotary machine. The utilization of a control voltage derived from the secondary motor circuit has the advantage of avoiding the additional machine and can be performed with stationary circuit elements. However, in the form heretofore disclosed, the application of control energy taken from the secondary circuit of the motor is less accurate and less reliable in control performance than a pilot generator because the voltage and current induced in the rotor circuit are less determinate as regards their dependency on the motor speed, especially under operating conditions which involve a high degree of primary voltage unbalance.

It is, therefore, a specific object of the present invention to improve control systems of the above-mentioned type in such a manner as to avoid the necessity of using a pilot generator or the like rotating machine and to secure nevertheless a high accuracy and reliability of performance with the aid of a control voltage derived from the secondary motor circuit.

Another object of my invention is to provide a voltage balance control system for alternating-current motors which permits changing the motor torque under control by the operator, and especially during low-speed lowering operations of a hoist control system, so that the torque can be increased voluntarily to a value different from the torque resulting from the then selected position of the master controller.

According to my invention, the primary energizing circuit of a wound rotor motor is provided with voltage control means which permit imposing a controllable unbalance on the voltage effective between the motor terminals, and these control means are connected with the secondary circuit of the motor through devices which control the unbalance in dependence upon the frequency of the voltage induced in the secondary motor circuit.

According to another feature of my invention, the voltage unbalancing control means and the appertaining frequency responsive means are so designed that a highly unbalanced primary voltage is obtained at low motor speeds or zero speed in order to operate the motor at correspondingly low torque or under counter torque. In conjunction with such a system, my invention involves also the use of biasing means which are effective between the voltage unbalancing control means of the primary circuit and the frequency responsive means attached to the secondary circuit, such biasing means being controllable by the operator in order to change the motor torque from that normally occurring at a given adjustment of the master controller.

These and other objects and features of the invention as well as the means required for achieving the objects will be apparent from the following description of the embodiment exemplified by the drawings, in which:

Figure 1 represents schematically the circuit diagram of a hoist control system, Fig. 2 shows a schematic and simplified showing of one of the circuits involved in the same system.

Figure 3:
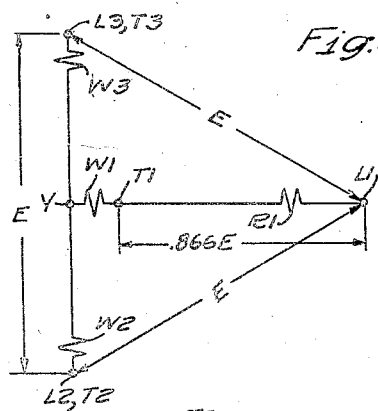
Figure 4:
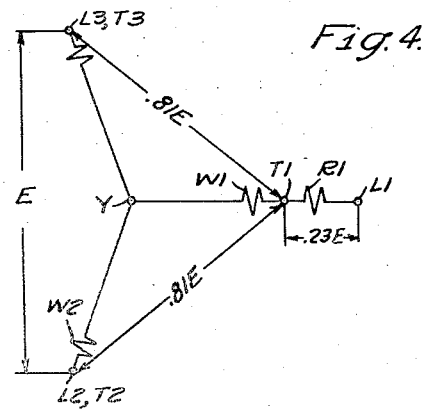
Figure 5:
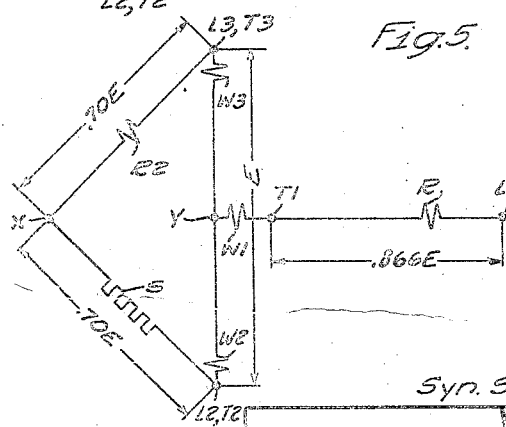
Figure 6:
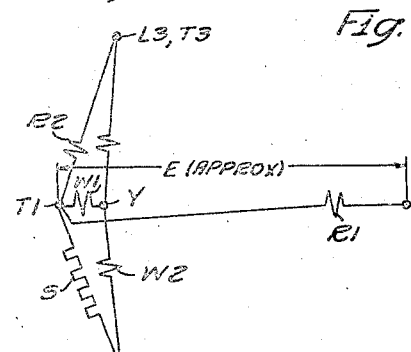
Figure 7:
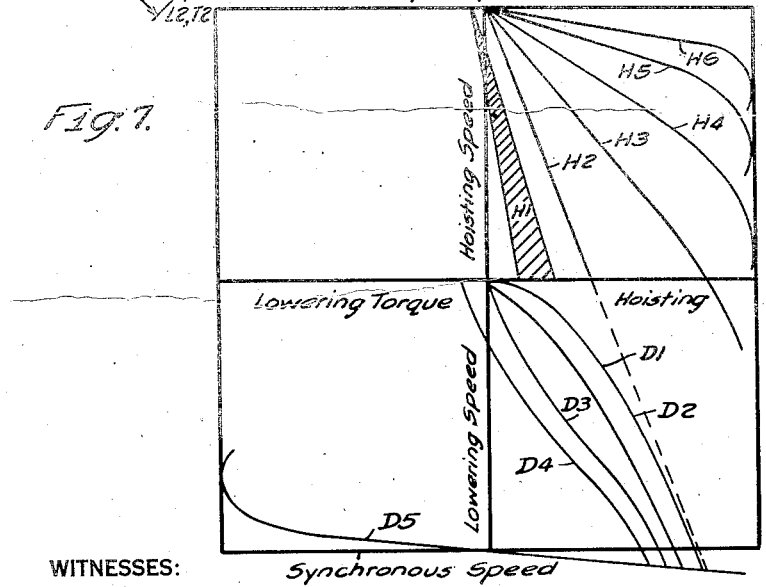

Figs. 3 and 4 are explanatory diagrams for illustrating the voltage conditions of a main reactor appertaining to the control system of Fig. 1, Figs. 5 and 6 are schematic diagrams for explaining the voltage conditions of a torque-reversing reactance-resistance combination also forming part of the control system of Fig. 1, while Fig. 7 typifies a set of speed torque characteristics obtainable in a control system, as illustrated in Fig. 1.

Referring to Fig. 1, the hoist motor to be controlled is denoted by M. This motor is of the wound rotor type. Its primary windings, schematically represented by a large circle, are connected to the primary motor terminals T1, T2, and T3. The motor terminals are attached to the three mains of a power supply circuit whose line terminals are denoted by L1, L2, and L3, respectively. The connection between the primary motor terminals and the line terminals is controlled by two contactors 1H and 1L. Contactor 1H has main contacts 1, 2, and 3 operated by a coil 4 which also actuates an auxiliary contact 5. The main contacts 6, 7, and 8 of contactor 1L are controlled by a coil 9. Only one of contactors 1H and 1L is closed at a time; and the main contacts of these contactors are so connected with the energizing circuit of the motor that contactor 1H when closed energizes the primary motor windings normally for developing hoisting torque, while contactor 1L when closed causes the motor M to normally develop torque in the lowering direction.

A main control reactor R1 is disposed between the primary motor terminals and the line terminals but lies in only one phase of the energizing circuit. Reactor R1 is composed of two saturable magnet cores 10 and 11 each carrying an alternating-current winding 12 and 13, respectively. Both cores 10 and 11 are linked by a direct-current winding 14 which permits premagnetizing the cores 10 and 11 in order to change the reactance value of windings 12 and 13. Windings 12 and 13 can be short-circuited by the contact 15 of a contactor 1R whose control coil is denoted by 16. Hence, when contact 15 is closed, the main reactor R1 is ineffective. With contact 15 open, the potential at motor terminal T1 depends on the degree of excitation imposed on the direct-current winding 14. The reactor is so rated that the primary motor voltage at terminals T1, T2, and T3 is approximately balanced when the reactance of coils 12 and 13 is at a minimum, i. e. when the direct-current winding 14 is excited sufficiently to induce maximum premagnetization or saturation in the cores 10 and 11. On the other hand, with minimum or zero excitation on winding 14, the reactance of coils 12 and 13 is at a maximum so that, with contact 15 open, an approximate single phase excitation is imposed on the primary motor terminals.

Arranged between the three phases of the primary energizing circuit of motor M is a torque-reversing unbalancing device consisting of the combination of a reactor R2 and a resistor S. The midpoint X of reactor and resistor is attached to terminal T1. The other two terminals of the combination are attachable to motor terminals T3 and T1, respectively, under control by the contacts 17 and 18 of a contactor 2L whose operating coil is denoted by 19. The purpose of this device is to render the primary motor voltage unbalanced to such an extent as to reverse the phase rotation at the primary motor terminals as compared with the phase rotation of the line voltage effective between the line terminals L1, L2, and L3.

The motor M is equipped with a normally effective friction brake 21 which is releasable by a magnet coil 22 which receives excitation through a rectifier 23 and a transformer 24 from the primary energizing circuit of motor M. Whenever this circuit is energized due to the closure of one of contactors 1H and 1L, the coil 22 is excited and hence releases the friction brake 21 for operation of the motor.

The secondary windings of motor M, schematically represented by an inner circle, are attached to the secondary terminals S1, S2, and S3. The exterior secondary circuit (rotor circuit) of the motor contains three groups of resistors denoted by 25, 26, 27, and 28, 29, 30, and 31, 32, 33, respectively.

A master controller MC actuable by the operator has a series of contact fingers, such as those denoted by 34, and is provided with three groups of contact segments 35, 36, and 37. The master controller, shown in developed form, has an "off" position, six selective positions for controlling the motor M to operate in the hoisting direction, and five selective positions to control the lowering operation of the motor.

The above-mentioned groups of resistors in the secondary motor circuit are connected to the contact fingers of the master controller cooperating with the segment group 35. The segment group 37 serves to control the above-mentioned contactors 1H, 1L, 1R, and 2L as well as two control contactors 1CR, and 2CR, in a given relation to the control condition of the secondary motor circuit. The contactor 1CR has a control coil 38 and a contact 39 connected to one of the contact fingers associated with the segment group 37. In the "off" position of the master controller, coil 38 receives excitation from a terminal T through segment group 37 and hence closes its contact 39 which then establishes a self-holding circuit for coil 38. Consequently, the relay 1CR is closed as soon as the current source for energizing the contactors is connected to the contactor circuits. When thereafter the motor controller is moved out of the "off" position, relay 1CR stays picked up due to its holding circuit. The energization, then passing through the segment group 37 to the various other contactors of the system, is now supplied through the contact 39. Consequently, when voltage failure occurs, causing the relay 1CR to drop out, all contactors are reenergized, thereby stopping the motor. In order to restart the control operation after the occurrence of such failure, the master controller must first be turned back to the "off" position. It will be understood that the terminal T and the one terminal of relay 1CR, denoted by inscribed plus sign, are connected to the same pole of a suitable current source, while all other terminals of the contactors, these terminals being denoted by an inscribed minus sign, are connected to the other pole of the current source. The current source consists preferably of a circuit which derives its excitation from the line terminals L1, L2, and L3, so that the above-described drop-out performance of relay 1CR will take place in response to voltage failure in the energizing circuit of the motor. The just-mentioned circuit connections between the contactors and the line terminals L1, L2, and L3 are not illustrated in order to prevent obstructing the drawings by details which are well known as such and not essential for the present invention proper.

Contactor 2CR has a coil 40 which controls two contacts 41 and 42 under certain operating conditions of the system to be explained in a later place. Coil 40 receives excitation through the segment group 37 of the master controller only when the controller is set on point 1 hoisting. Segment 36 has the appertaining contact fingers connected with a tapped resistor 43 whose function will also be referred to below.

Three transformers 44, 45, and 46 are connected across the secondary motor terminals S1, S2, and S3 so as to be energized by the three respective phase voltages of the secondary circuit. A capacitor 47, 48, and 49, respectively, is series connected in the primary circuit of each transformer. The secondaries of the transformers are attached to the input terminals of three rectifiers 50, 51, and 52. The output terminals of these rectifiers are interconnected in order to provide a full-wave rectified output voltage. The transformers 44, 45 and 46 are rated for operation under a high degree of iron saturation so that the amplitude of their respective output voltages does not appreciably exceed a given value regardless of changes in input voltage. As a result, the rectified output voltage of rectifiers 50, 51, and 52 is substantially independent of the magnitude of the secondary motor voltage, but changes substantially in accordance with the frequency of that voltage, as will be explained hereinafter.

The excitation of the above-mentioned direct-current winding 14 of the main reactor R1 is controlled by the frequency-measuring output voltage of rectifiers 50, 51, and 52 through circuit connections which include a composite pilot reactor R3 which acts as an amplifier. This reactor has four saturable magnet cores 53, 54, 55, and 56, each provided with an alternating-current coil A, B, C, or D. The cores 55 and 56 are linked by two direct-current coils 57 and 58. The alternating-current coils A, B, C, and D are so connected with one another as to form a Wheatstone bridge circuit, as represented schematically in Fig. 2. The input terminals I1 and I2 of this bridge circuit are connected to the line terminals L1 and L3, respectively. The output terminals O1 and O2 of the bridge are connected to a transformer 59 whose secondary energizes the direct-current winding 14 of the main reactor R1 through a rectifier 60. The direct-current coil 58 serves to premagnetize the two cores 55 and 56 in accordance with the frequency-measuring control voltage supplied by rectifiers 50, 51, and 52 through a connecting lead 61, the above-mentioned resistor 43, a rheostat 62, and another lead 63. Part of the rheostat 62 is short-circuited by the contact 41 when the relay 2CR is energized. The direct-current coil 57 of reactor R3 serves to impose a bias magnetization on this reactor. The excitation for this bias coil is derived from the primary energizing circuit of the motor through transformers 64, 65, and 66 and rectifiers 67, 68, and 69. Coil 57 is connected with these rectifiers through a resistor 70, an operator actuable control contact 71, and the leads denoted by 72, 73, and 74.

Before explaining the operation of the above-described system as a whole, it appears appropriate to first exemplify some details, ratings, and functions of the various groups of apparatus embodied in the system. In order to facilitate understanding the invention, the following description of these different apparatus groups contains references to numerical values. It should be understood, however, that these numerical values are mentioned only by way of example and may be modified in accordance with the requirements and desiderata of each particular application of my invention.

*Main reactor*

As stated above, the purpose of the main reactor R1 is to change the motor from single-phase performance at zero speed to near three-phase performance at other speeds when contactor 1R is open and one of contactors 1H and 1L closed. The alternating-current windings 12 and 13 on cores 10 and 11, respectively, are connected so that the magnetic flux in each core is always equal in magnitude to that of the other but of opposite polarity. The direct-current winding 14 is wound so as to enclose both cores. Since the fluxes in the two cores are always in opposition, the net flux linking the direct-current winding adds up to zero, and no alternating-current voltage is effective in the circuit of the direct-current winding. The maximum impedance of the reactor (without D. C. magnetization) may correspond to the formula $$Z_{max} = \frac{.026 E^2}{\text{motor H. P.}} \text{ ohms}$$

wherein E is the line voltage. It follows from this formula that the current taken from L1 with the reactor at maximum impedance is about 0.17 ampere per horse power at 220 volts. The minimum impedance of the reactor (with full D. C. saturation) is then given by $$Z_{min} = \frac{.00047 E^2}{\text{motor H. P.}} \text{ ohms}$$

The comparison of these formulas shows that in this example the impedance value changes through a range of about 55 to 1. In combination with the motor, maximum impedance of the reactor produces vector voltages on the motor windings in accordance with the diagram of Fig. 3. In Fig. 3, the three primary motor windings are denoted by W1, W2, and W3, respectively. Virtually single phase excitation is applied across windings W2 and W3, and no appreciable voltage is applied to winding W1. At minimum impedance, and with a motor rotor resistance which would provide 125% current at stall with balanced full voltage applied to terminals L1, L2 and L3, the voltage drop across the reactor is about 23% of the line voltage, and the unbalanced three phase voltage impressed on the motor windings is in accordance with the diagram of Fig. 4. The current through the reactor varies from about 5% of full load motor current at maximum impedance, to 85% at minimum impedance. The direct-current winding 14 is designed to produce full saturation of cores 10 and 11 at a direct-current excitation of about 30 volts.

*Frequency responsive control device*

In order to excite the main reactor R1 in response to motor speed, the excitation must originate from a performance quantity which varies in some respect with the speed. As explained, the frequency of the current induced in the secondary or rotor circuit of the motor serves, according to the invention, as a measure of the motor speed. It can be shown mathematically and experimentally that the secondary terminal voltage of a motor energized by an unbalanced primary voltage represents the summation of two component voltages and is subject to modulation and variation depending on motor speed and degree of primary voltage unbalance. For instance, for a low unbalance of primary voltage, there is a secondary voltage at synchronous speed which rises in general as the slip increases; and for 100% unbalance (single phase excitation), the secondary voltage is substantially constant throughout the speed range of the motor.

As explained previously, the transformers 44, 45, and 46 connected to the motor secondary terminals operate with highly saturated cores and in connection with series capacitors 47, 48 and 49, respectively. The high degree of saturation acts as a means for limiting the output voltage, i. e. changes in input voltage have little effect on the magnitude of the output voltage (control voltage) once the input voltage has increased beyond a low value which is always exceeded during the normal operation of the motor. The highly saturated transformers act also to produce a peaked wave form of the output or control voltage. The purpose of the capacitors is to increase the input voltage with rising frequency. As a result, the control voltage at the secondary terminals of the transformers responds more readily to the change in frequency which is orderly, than to a change in the magnitude of the motor secondary voltage, which is less determinate. Since the control voltage, after rectification by rectifiers 50, 51, 52 is biased against a constant direct-current voltage, only the crests of the peaked wave form are effective to excite the reactor coils 58. When the motor speed increases, there are more peaks per second, and they are of greater magnitude, all due to frequency increase. Therefore, such rise in motor speed produces a greater effective output voltage of the frequency responsive transformer circuit.

*Bias system*

While, as explained, the control voltage rises with increasing speed, its value at zero speed is not zero but amounts to about 50% of the highest value attained at the highest speeds. It is, as a rule, desired that the premagnetization of the main reactor R1 be substantially zero at zero speed. Therefore, my invention provides biasing means which balance out whatever control voltage is present at zero speed. The necessary bias voltage is supplied by the transformers 64, 65, 66 and associated rectifiers 67, 68, 69 and is so rated that the reactor cores 55 and 56 are not premagnetized and no voltage is applied to the direct-current windings 14 of the main reactor when motor M is at rest.

Actually, it is impossible to exactly balance the control voltage at zero speed by a constant voltage from rectifiers 67, 68, 69 because the control voltage has no definite fixed value at zero speed. With an unbalanced primary voltage at very low speed there is a corresponding very low-frequency three-phase modulation of 100% amplitude in the secondary voltage of the motor (the result of heterodyning of positive and negative sequence voltages with frequencies nearly equal). At zero speed the positive and negative sequence voltages may cancel in one phase and add in others, depending on the position of rotor windings with respect to the pulsating single-phase stator field. At zero speed, therefore, the voltage across any two secondary motor terminals may be zero, and the voltage across all secondary terminals may go successively through zero at very low speed. This results in a modulation in the amplitude of the direct-current control voltage (between leads 61 and 63) in the ratio of about 3 to 2. Best results are obtained by balancing the bias voltage (between leads 70 and 74) against the crests of the modulation in control voltage, preferably with the crests exceeding the bias voltage by a slight amount.

*Amplifier*

The purpose of the reactor set R3 is to amplify the resultant effect of the frequency responsive control voltage and bias voltage. As mentioned above, the four alternating-current coils A, B, C, D of the reactor device R3 form an alternating-current bridge with four equal impedances each with an independent iron core. The cores 55 and 56 for coils A and B, respectively, are adjacent to each other and have opposite fluxes. When the D. C. coils 58 and 57, limiting the two covers 55 and 56, are not excited, the bridge circuit (Fig. 2) is balanced so that there is no difference in potential between the output diagonal points O1 and O2. When coils 58 and 57 are energized, the impedance value of coils A and B becomes less than those of coils C and D, thus unbalancing the bridge so that a voltage appears between points O1 and O2. The transformer 59 applies the output of the bridge to the rectifier 60, for instance, so as to produce about 30 volts direct-current output for maximum unbalance of the bridge. The direct-current coils 58 and 73 may be rated to produce maximum balance at about 15 volts rectified control voltage and may be designed as duplicates.

*Torque reversing unbalancing device*

The voltage unbalance obtainable by means of the main reactor R1 does not change the sequence of the phase voltage. That is, when the phase sequence of the line voltage at line terminals L1, L2, L3 is clockwise, as in the diagrams of Figs. 3 and 4, the voltage sequence at the motor terminals T1, T2, T3 and is also clockwise within the available control range of the main reactor when contactor 1H is closed and is counterclockwise when contactor 1L is closed.

The purpose of the reactor R2 in combination with resistor S is to unbalance the motor voltage to such an extent as to produce a phase rotation at the motor terminal in the direction opposite to that adjusted by the contactor 1H. Reactor R2 and resistor S are proportioned to assume a vector relation of their own accord, as typified by the diagram of Fig. 5, where, for example, the voltage drop across each is about 0.70 E. When the junction point X between elements R2 and S is connected to T1 by the closure of contactor 2L each of reactor R2 and resistor S is paralleled by the motor windings W3 and W2, respectively, with the result that the phase displacement between the reactor and resistor voltages is greatly reduced such as exemplified by the diagram of Fig. 6. If the reactor and resistor are rated for equal resistance, for instance, according to the formula below, when in the vector relation of Fig. 5, there is sufficient phase displacement (Fig. 6) to produce enough torque to overcome motor and hoist friction and to produce down rotation although the hoisting contactor 1H is closed:

$$Z = \frac{.0032 E^2}{\text{motor H. P.}} \text{ ohms}$$

This formula refers to the maximum impedance, but reactor R2 and resistor S may be provided with taps so that this value can be reduced if desired, for instance to 66% of the maximum value, for permitting a field adjustment to take care of variations in hoist friction. The reactor R2 has preferably a small air gap to prevent saturation of the iron at working currents. In the example referred to, about one ampere per horsepower flows through this circuit at 220 volts.

*Operator-actuated controls*

The controls to be actuated by the operator consist of the above-mentioned master controller MC and of the contact 71. Contact 71 is preferably designed as a push button and may be arranged near or within the handle of the master controller so that the button can be operated by the thumb. A foot-operated contact 71, however, can also be used to advantage.

The master controller MC serves to correlate the operation of the main reactor and the torque-reversing unbalancing device with the control condition of the secondary motor circuit. The purpose of the additional contact 71 is to permit changing the motor torque from that normally prevailing at a chosen adjustment of the master controller. In the illustrated example, the system is so designed as to produce zero torque at zero speed during lowering operations of the motor, and the push-button contact 71 serves to permit obtaining a finite value of torque at zero speed for inching operations.

*Performance*

The first controller point in the hoist direction, closes IH for hoisting direction, but leaves IR open so that the reactor R1 is in circuit and the primary voltage is unbalanced. Relay 2CR closes to upset the normal bias for the amplifying reactor R3 so as to apply some excitation to the direct-current winding 14 of reactor R1. This excitation may be increased by operation of the thumb button 71. This permits a selection of torques at stall from about 30% to 60% normal so that the speed torque characteristic lies within the area H1 in Fig. 7.

The second point hoist closes IR to eliminate the reactor R1 and apply balanced voltage to the motor primary. The torque is increased to 100–125% normal per curve H2 in Fig. 7. Point hoists 3—4—5—6 remove successively resistance from the rotor circuit to produce speed torque curves H3, H4, H5, H6 according to Fig. 7.

Point 1 in the lowering direction closes IH to establish hoisting phase rotation on the motor, with IR open and the reactor R1 in circuit. All secondary resistors are in the rotor circuit, to produce zero torque while the motor is at rest according to curve D1 in Fig. 7. If there is sufficient overhauling load to start rotation, the impedance of R1 is reduced as a result of increased D. C. saturation, and a counter torque appears which opposes the motion. With increasing speed the opposing torque rises (see Fig. 7) because the motor approaches to a greater degree a true three-phase operation due to lessened unbalance in the primary voltage, and also because of the disappearance of negative sequence torque near negative synchronous speed.

Controller points 2 and 3 lowering result in higher speeds for a given load, due to the insertion of more resistance of resistor 43 into the control circuit of reactor R3. This causes a higher degree of premagnetization or saturation of reactor R1 to take place at higher speeds than on lowering point 1 of the controller, as is apparent from the characteristics D2 and D3 in Fig. 7.

If there is insufficient load to start rotation or produce sufficient speed on lowering points 1, 2, 3, the controller is moved to point 4 to close contactor 2L. This connects the device R2, S to the primary circuit with the result of producing driving down torque at very low speeds and decreased retarding torque at higher speeds according to curve D4 in Fig. 7.

The final lowering point of the controller opens contactor IH and closes contactor IL to produce "down" phase rotation of the primary terminal voltage, and removes all but the permanent resistance from the motor secondary circuit, to produce full speed at no load and regeneration for overhauling loads according to curve D5 in Fig. 7.

On any of the controller points 1, 2, 3 and 4, the thumb button 71 may be used to provide torque at zero speed. By proper manipulation, loads up to 100% may be brought to rest or inched down by a refined speed control.

It will be obvious to those skilled in the art upon studying the foregoing disclosure that control systems according to my invention can be modified in various respects and as regards different details or apparatus groups thereof without departing from the essential features of the invention as set forth in the claims attached hereto.

I claim as my invention:

1. A motor control system, comprising a wound rotor motor having primary windings and secondary windings, multiphase current supply means for impressing alternating multiphase voltage on said primary windings, control means associated with said power supply means for varying the balance condition of said voltage, and circuit means disposed between said secondary windings and said control means for controlling the latter to operate in dependence upon the frequency of the secondary current induced in said secondary windings, said circuit means having transformer means operative at a high degree of iron saturation primarily connected across said secondary windings for deriving therefrom a control voltage determined substantially only by the frequency of said secondary current.

2. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, and frequency-responsive circuit means disposed between said secondary circuit and said direct-current windings and including rectifier means for exciting said direct-current windings in dependence upon the frequency of the current induced in said secondary circuit in order to cause said reactor means to vary said balance condition substantially in response to changes in said frequency.

3. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, a transformer means operative with a high degree of iron saturation and connected to said secondary circuit so as to produce a secondary transformer voltage dependent substantially only on the frequency of the current induced in said secondary circuit, and rectifying circuit means connected between said transformer means and said direct-current windings for energizing the latter by direct current varying substantially in accordance with said frequency in order to cause said reactor means to vary said balance condition accordingly.

4. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, frequency-responsive circuit means disposed between said secondary circuit and said direct-current windings and including rectifier means for exciting said direct-current windings by a control voltage varying substantially in accordance with changes in frequency of the current induced in said secondary circuit in order to cause said reactor means to vary said balance condition accordingly, and means for imposing a bias voltage on said direct-current windings so as to render their resultant excitation approximately zero at zero speed of said motor.

5. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, frequency-responsive circuit means disposed between said secondary circuit and said direct-current windings and including rectifier means for exciting said direct-current windings by a control voltage varying substantially in accordance with changes in frequency of the current induced in said secondary circuit in order to cause said reactor means to vary said balance condition accordingly, a rectifying network having alternating-current input leads connected to said primary circuit and direct-current output leads connected to said direct-current windings for imposing a bias voltage on said direct-current windings so that the degree of unbalance caused by said reactor depends on the resultant effect of said control voltage and said bias voltage, and circuit means connected with said output leads for controlling the magnitude of said bias voltage.

6. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, frequency-responsive circuit means disposed between said secondary circuit and said direct-current windings and including rectifier means for exciting said direct-current windings by a control voltage varying substantially in accordance with changes in frequency of the current induced in said secondary circuit in order to cause said reactor means to vary said balance condition accordingly, and circuit means connected with said direct-current windings for imposing thereon a bias voltage so that the degree of unbalance caused by said reactor depends on the resultant effect of said control voltage and said bias voltage, and operator-actuable control means forming part of said circuit means for selectively varying said bias voltage in accordance with derived speed torque conditions of the motor.

7. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, translating means connected to said secondary circuit for providing a control voltage varying substantially in dependence upon the frequency of the current induced in said secondary circuit, amplifying means disposed for amplifying said control voltage and connected to said direct-current windings for controlling said reactor means to unbalance said multiphase voltage in a degree substantially in accordance with said frequency.

8. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, a control network having translating means connected to said secondary circuit for providing a control voltage varying substantially in dependence upon the frequency of the current induced in said secondary circuit, amplifying means forming part of said network for amplifying said control voltage and being connected to said direct-current windings, and circuit means associated with said network for imposing thereon a voltage bias for approximately compensating said control voltage at zero speed of the motor.

9. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, a control network having translating means connected to said secondary circuit for providing a control voltage varying substantially in dependence upon the frequency of the current induced in said secondary circuit, amplifying means forming part of said network for amplifying said control voltage and being connected to said direct-current windings, circuit means associated with said network for imposing thereon a voltage bias for approximately compensating said control voltage at zero speed of the motor, and operator-controlled contact means for changing said voltage bias in order to permit adjusting the motor torque.

10. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, saturable pilot reactor means having four main coils for alternating current connected in series relation to one another to form the four respective branches of a bridge network and having control coils inductively associated with two of said main coils lying in diagonally opposite bridge branches so that the balance condition of said bridge network changes in dependence upon the excitation of said control coils, means for supplying alternating current to two of diagonally opposite points of said network, rectifying means disposed between the remaining two diagonal points of said network and said direct-current windings, and frequency-responsive translating means attached to said secondary circuit and connected to said control coils for exciting the latter by direct-current control voltage varying substantially in accordance with the frequency of the current induced in said secondary circuit, whereby said reactor means are caused to unbalance said multiphase voltage in a degree substantially in accordance with said frequency.

11. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, saturable pilot reactor means having four main coils for alternating current connected in series relation to one another to form the four respective branches of a bridge network and having control coils inductively associated with two of said main coils lying in diagonally opposite bridge branches so that the balance condition of said bridge network changes in dependence upon the excitation of said control coils, means for supplying alternating current to two of diagonally opposite points of said network, rectifying means disposed between the remaining two diagonal points of said network and said direct-current windings, and circuit means connected to said control coils for providing variable direct-current excitation therefor and including frequency responsive translating means connected to said secondary circuit for providing a component control voltage variable substantially in accordance with the frequency of the current induced in said secondary circuit, and operator-controllable contact means for providing a component bias voltage so that said reactor means are caused to unbalance said multiphase voltage in a degree substantially in accordance with motor speed and actuation of said contact means.

12. A motor control system, comprising a wound rotor motor having a primary circuit and a secondary circuit, multiphase current supply means for impressing alternating multiphase voltage on said primary circuit, saturable reactor means disposed for controlling the balance condition of said voltage and having alternating-current windings arranged in said primary circuit and direct-current windings for controlling the reactance of said alternating-current windings, saturable pilot reactor means having four main coils for alternating current connected in series relation to one another to form the four respective branches of a bridge network and having two sets of jointly operative control coils inductively associated with two of said main coils lying in diagonally opposite bridge branches so that the balance condition of said bridge network changes in dependence upon the excitation of said control coils, means for supplying alternating current to two diagonally opposite points of said network, rectifying means disposed between the remaining two diagonal points of said network and said direct-current windings, frequency-responsive translating means attached to said secondary circuit and connected to one set of said control coils for exciting the latter by direct-current control voltage varying substantially in accordance with the frequency of the current induced in said secondary circuit, circuit means connected to said other set of control coils for exciting the latter by a bias voltage so as to normally approximately compensate said control voltage at zero speed of the motor, and operator-actuable contact means forming part of said circuit means for changing said bias voltage in order to permit adjusting the motor torque.

13. A motor control system, comprising a wound rotor having a multiphase primary circuit and a secondary circuit, a saturable reactor disposed on one phase of said primary circuit and having a control winding for varying the voltage of said primary circuit between substantially balanced and approximately single-phase condition, a resistance reactance combination connected between different phases of said primary circuit for unbalancing, when operative, said voltage so as to reverse the phase sequence of motor excitation, frequency-responsive control means disposed between said secondary circuit and said control winding and including rectifier means for exciting said control winding by direct-current varying substantially in dependence upon the frequency of the current flowing in said secondary circuit, and operator-controllable contact means for rendering said reactor and said resistance reactance combination operative and inoperative in order to permit adjusting the system selectively for energizing the motor by voltage of balanced and differently unbalanced voltages, respectively.

WILLIAM R. WICKERHAM.